April 22, 1969 R. J. CARBARY ET AL 3,440,308
METHOD OF MAKING A REFRIGERATOR CABINET ASSEMBLY
Filed Sept. 9, 1965
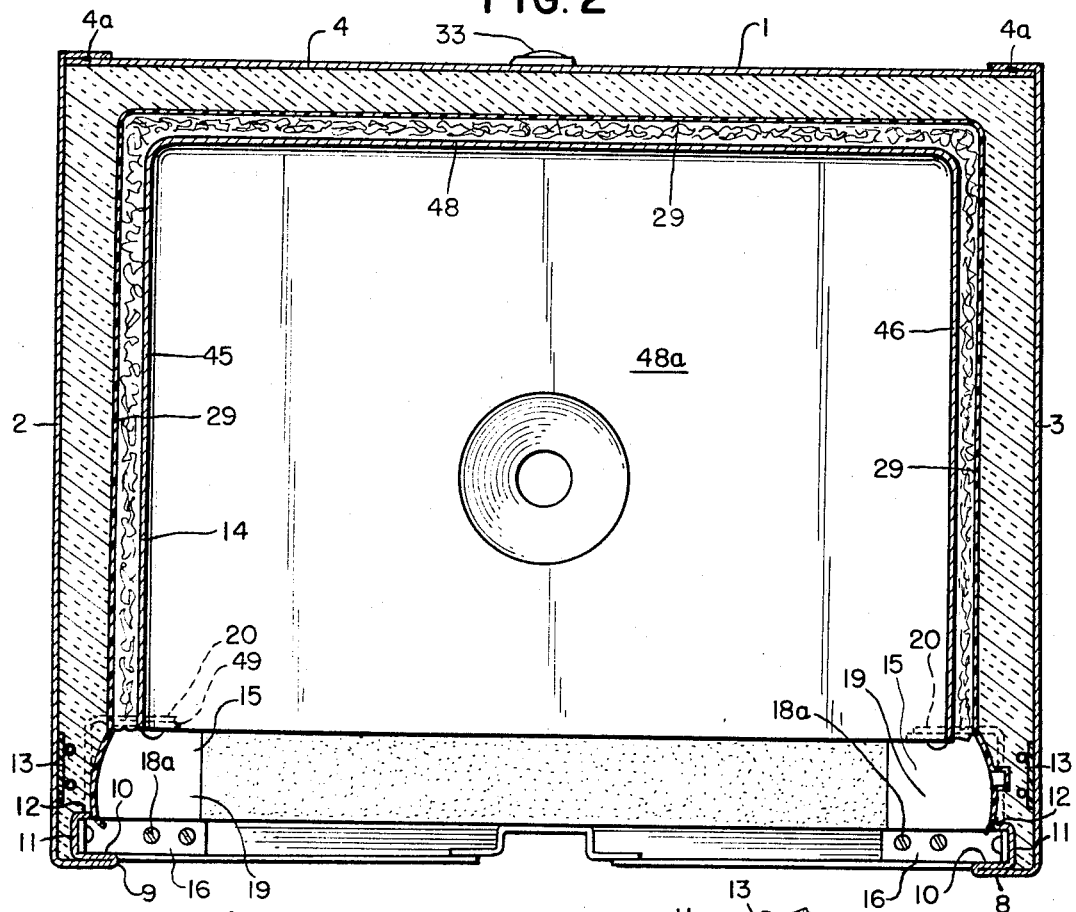
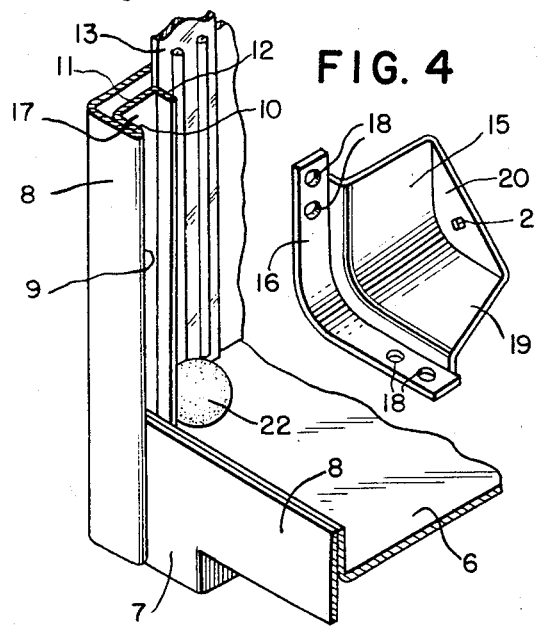
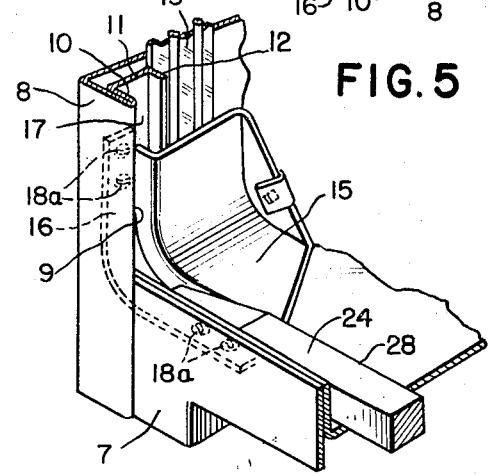
INVENTORS
Richard J. Carbary
Arthur J. Harder
By Derek P. Laurence
Attorney

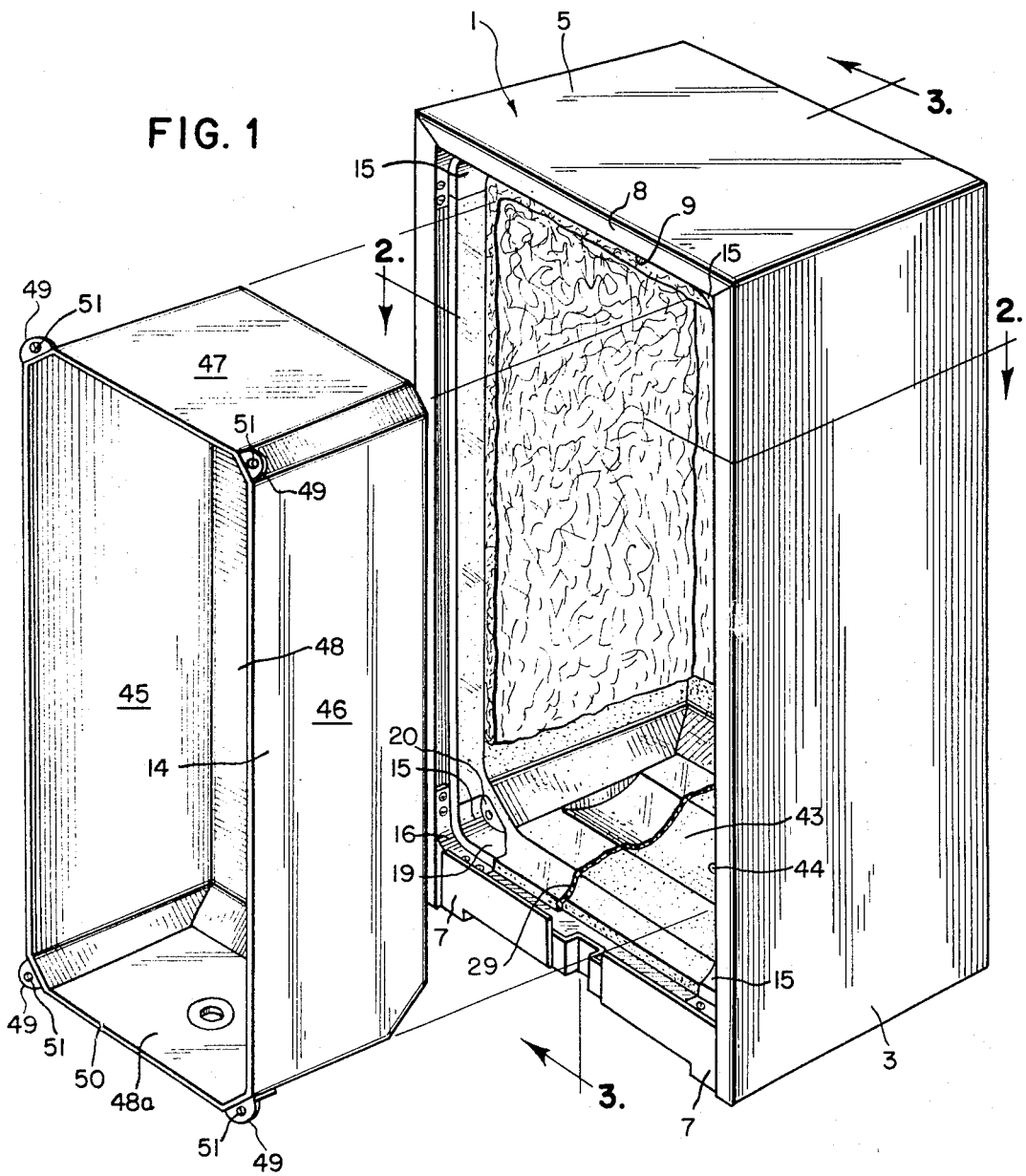

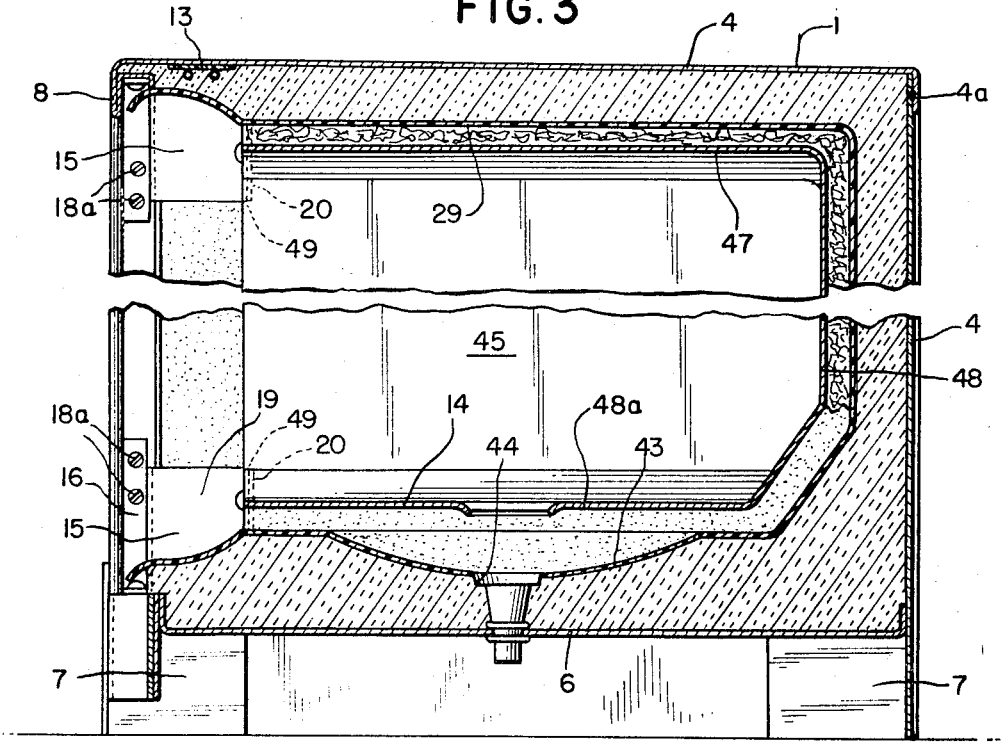
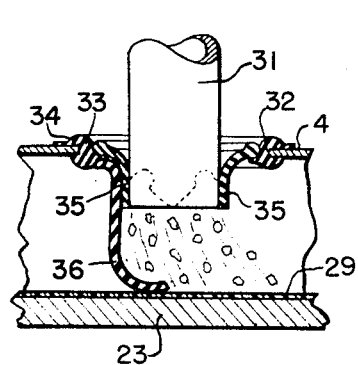
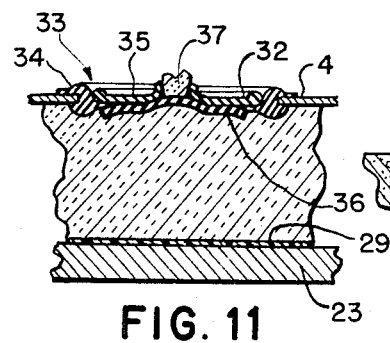
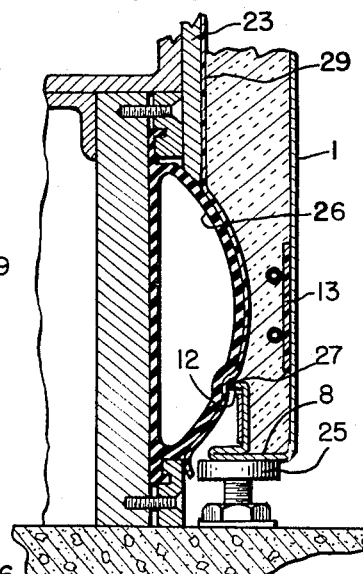

April 22, 1969 R. J. CARBARY ET AL 3,440,308
METHOD OF MAKING A REFRIGERATOR CABINET ASSEMBLY
Filed Sept. 9, 1965
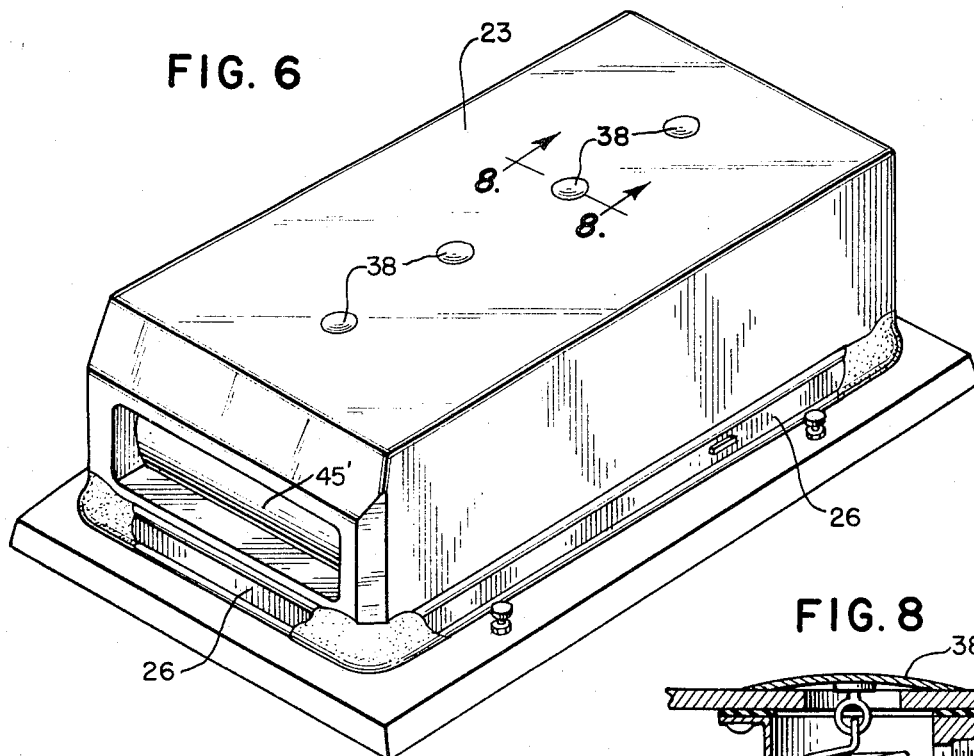
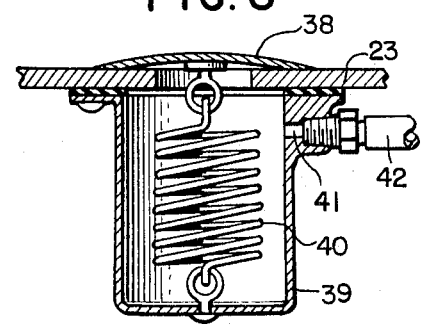
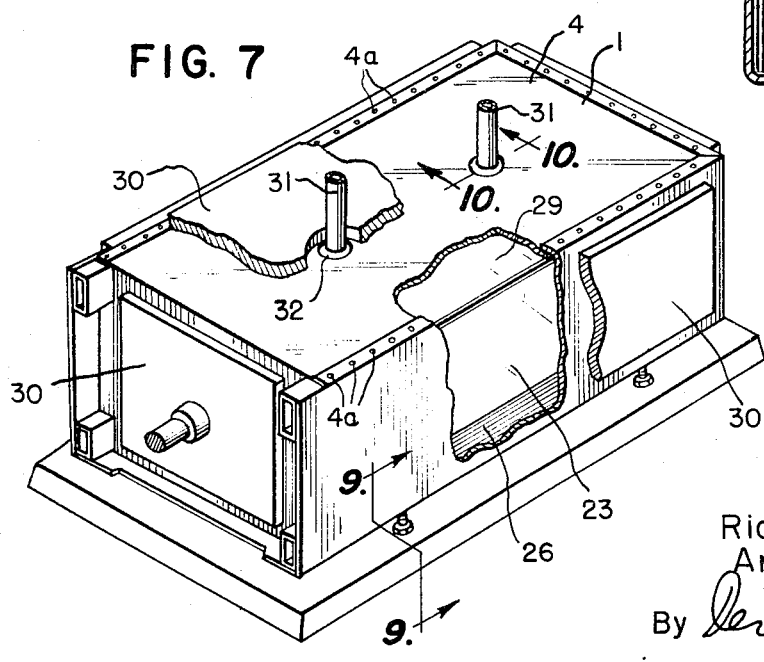
INVENTORS
Richard J. Carbary
Arthur J. Harder
By Derek P. Lawrence
Attorney

United States Patent Office

3,440,308
Patented Apr. 22, 1969

3,440,308
METHOD OF MAKING A REFRIGERATOR CABINET ASSEMBLY
Richard J. Carbary, La Grange, and Arthur J. Harder, Franklin Park, Ill., assignors to General Electric Company, a corporation of New York
Filed Sept. 9, 1965, Ser. No. 485,997
Int. Cl. B29d 27/00; B29h 7/20; A47b 75/00; B32b 25/10
U.S. Cl. 264—45    6 Claims

ABSTRACT OF THE DISCLOSURE

A method of making an insulated refrigerator cabinet which comprises molding a layer of foamed insulation into contact with the inner surface of the outer casing, securing a compressible glass wool lining to the exposed or inner surfaces of foamed insulation, and inserting the cabinet liner into the casing. The glass wool lining is of a thickness such that it is compressed by insertion of the liner.

---

This invention relates to refrigerator cabinet assemblies, and methods of manufacturing them; more specifically, it relates to refrigerator cabinets which utilize foamed resin insulation, and to manufacturing methods which incorporate as part thereof the curing of the foamed resin in a mold used in cooperation with the refrigerator outer casing.

It is now becoming common practice, in the manufacture of refrigerators (and it will be understood that the term "refrigerators" includes devices for storing at temperatures above freezing, below freezing, or both) to use a foamed polyurethane resin for the heat insulating agent. Several ways of providing the foamed resin, in position within the outer casing, are used; while many of these give results which, on the whole, are satisfactory, all the known approaches also incorporate disadvantages which have been found difficult to overcome. For instance, one technique which has been used is to foam the resin between the refrigerator inner liner and the outer casing after they have already been put in their ultimate relationship. While this usually provides satisfactory insulation, it also includes the difficulty of flaws in the insulation (and these are bound to occur sometime) and are very difficult to discover. In addition, the amount of resin, and the extent to which it is foamed, have to be exceedingly carefully controlled to avoid pressures which would cause bowing of the casing or the liner.

The approach has also been used of providing, in the technique just described, a film of material, such as polyethylene, adjacent to the inner liner which prevents adherence of the foamed resin thereto. When this is done, the inner liner may be removed, but it is still necessary to dismantle the refrigerator cabinet in order to determine if any major flaws have occurred in the resin during the foaming process. Further, the securement of the film of material also presents some difficulties.

There is the further point here that, even though the liner is, to some extent, removable, it may be difficult to replace one liner with another if that should be necessary. This results because in mass production—the only practical way to make refrigerators in large numbers at a competitive price—neither the casing nor the liner is exactly square; there are departures, within tolerance limits, from true squareness. Although the liner which is present during foaming will fit snugly within the foamed insulation, another liner, which looks just the same, may have just enough difference in dimensions not to fit properly.

Another approach which has been used is to insert slabs of pre-formed foamed insulation into position and secure them to the casing, then to secure the inner liner against them, either directly or after insertion of an intermediate air barrier. While the use of an intermediate air barrier does avoid the difficulty previously mentioned, that one liner may not be useable in the place of another even though they appear identical, the use of pre-foamed slabs has many disadvantages to it. For instance, it is necessary to provide a special means for causing the slabs to adhere to or be secured against the casing. Also, the fact that the slabs are molded in one place, and must then be transported to where the refrigerator cabinets are being assembled, means that some damage may occur to the slabs during transportation. Also, there is the need to make the slabs have an inter-fitting relationship, which means that several slab molds must be used, and great care must be exercised in the assembly.

It is, therefore, an object of our invention to provide an improved method of forming a refrigerator cabinet assembly using a rigid foamed polyurethane resin for heat insulation.

In one aspect thereof, our invention relates to a method of forming a refrigerator cabinet assembly of the type which includes an outer open-face casing intended to be closed by a door, and an inner liner which is spaced a predetermined distance in from the outer casing, and is adapted to be secured thereto at the open face thereof so as to be readily removable when so desired. In the first step of our improved method, the casing is positioned on a mold which is slightly larger than the liner, and the molding and curing of rigid foamed polyurethane resin thermal insulation is carried out to fill the space between the casing and the mold. The mold is of any appropriate type which releases the foamed insulation; thus, after the operation the casing may be removed with its inner surface lined with an appopriate thickness of foamed insulation.

Next, a thin layer of flexible material is secured to the inside surface of the foamed insulation to act as an air barrier. While this is preferably done over sides, back and top of the foamed insulation, it is important that the thin layer of flexible material extend at least from one side to the other of the open face at a vertically intermediate portion of the casing. This prevents air circulation in the space between the foamed insulation and the liner when it is secured to the casing. It also helps greatly to reduce the transfer of sound and vibration from the inside of the cabinet to the outside.

In the last step of our improved process, the liner is secured to the casing at the open face thereof in such a relationship that the distance between the liner and the casing is greater than the thickness of the rigid foamed insulation, but slightly less than the combined thickness of the foamed insulation and of the flexible air barrier in an uncompressed state.

When this is done, the flexible air barrier material is compressed as a result of the fact that the predetermined distance is not great enough to accept both the rigid foamed insulation and the uncompressed flexible air barrier material; as a result the flexible material is compressed and thereby effectively prevents air from circulating in the space between the foamed insulation and the liner, in addition to muffling sound within the cabinet.

This method of forming the structure makes it exceedingly simple to check whether the foamed insulation has been formed properly since, as an inherent part of the assembly of the structure, the entire inner surface of the foamed insulation will be visible and thus available for inspection.

A further very substantial advantage obtained by the above procedure is that, because there is actually a physical space between the polyurethane foam and the inner lining member, there can be no difficulty whatsoever in changing one liner for another when that is necessary.

The subject matter which we regard as our invention is particularly pointed out and distinctly claimed in the concluding portion of this specification. Our invention, however, together with further objects and advantages thereof, may best be understood by reference to the following description taken in conjunction with the accompanying drawings.

In the drawings, FIGURE 1 is an exploded view in perspective, partly broken away to show details, of the refrigerator cabinet assembly provided by our improved method;

FIGURE 2 is a cross-sectional view along line 2—2 in FIGURE 1;

FIGURE 3 is a cross-sectional view along line 3—3 in FIGURE 1;

FIGURE 4 is an enlarged exploded fragmentary view illustrating the structure provided at a corner of the outer casing of the refrigerator cabinet assembly for facilitating our improved method;

FIGURE 5 is a view in perspective similar to that of FIGURE 4 and illustrating the elements of FIGURE 4 in the assembled relationship, ready for the molding step of our improved method;

FIGURE 6 is a view in perspective showing the mold used in conjunction with one of the steps of our process;

FIGURE 7 is a view in perspective, similar to FIGURE 6, illustrating the introduction of foam to a refrigerator casing in position on the mold shown in FIGURE 6;

FIGURE 8 is a cross-sectional view along line 8—8 in FIGURE 6;

FIGURE 9 is a cross-sectional view along line 9—9 in FIGURE 7;

FIGURE 10 is a view in cross-section along line 10—10 in FIGURE 7;

FIGURE 11 is a view similar to FIGURE 10 at a different point in the process; and FIGURE 12 is an enlarged fragmentary view in perspective showing the welded securement of parts of the refrigerator casing.

Referring now to the drawings, and more particularly to FIGURES 1, 2, 3 and 7, there is shown an outer casing 1 for use as part of a refrigerator cabinet assembly. Such outer casings are conventionally of sheet metal formed into a generally rectangular shape as shown in the drawings, with sides 2 and 3, a back 4, a top 5, a bottom 6, and supporting legs 7 at the four corners of the bottom. It will, of course, be understood that any conventional assembly of sheet metal parts welded together may be used. However, in a preferred embodiment of our invention, the method is practiced on a casing where a single piece of sheet metal is bent into a U-shape and used for the top and the sides. The back, bottom, and legs are formed individually, and are then welded to the top and sides. As shown in FIGURES 7 and 12, back 4 is preferably spot welded to the sides and top; the spot welds are shown by the numerals 4a. It will be observed that, between the spot welds, the surfaces merely about each other, i.e., the connection of back 4 to the rest of the casing is not an airtight one.

At the front of casing 1 an inwardly extending flange 8 defines an opening 9 for providing access to the interior of the cabinet assembly when it is completed. It will be understood that, in the conventional way, a door (not shown) is eventually hinged to the cabinet so as to be movable between positions where it provides access to the interior of the refrigerator cabinet or closes the cabinet tightly to permit the keeping of foods in a refrigerated atmosphere.

Referring to FIGURE 2, we prefer to form the edges of the sheet metal which define opening 9 so that flange 8 is not the edge of the sheet metal but, rather, is an intermediate portion. A portion 10 is folded back against flange 8 for a portion of its length; another portion 11 then extends back toward wall 4 in spaced relation to the side walls and substantially parallel thereto. Then, finally, a terminal edge portion 12, in the form of a re-entrant flange, extends in the same direction as flange 8 but inwardly thereof, as shown.

Continuing with the description of the outer casing, it is conventional in many present day refrigerators to provide a heating assembly, shown by the numeral 13, which extends a substantial part of the height of both side walls 2 and 3 and across the top 5 of the casing adjacent opening 9. This is done to eliminate the condensation which has a tendency to occur otherwise around the opening. It will be understood that heater 13 is shown as a conventional item, and its inclusion or exclusion in no way relates to the present invention.

The refrigerator cabinet assembly which is formed by our improved process incorporates, of course, an inner lining 14 which constitutes the actual enclosure within which refrigeration is provided and perishables are stored. This part may be either of metal or plastic; in the particular case shown at metal liner is provided. This liner is secured to the outer casing 1 by suitable devices 15 provided at each of the four corners of opening 9.

Referring now to FIGURES 4 and 5, it can be seen that each fastening device 15 includes a portion 16 adapted to fit within the channel 17 formed between surfaces 10 and 12. In the specific embodiment shown, openings 18 are provided so that threaded members 18a may be passed therethrough into openings provided for that purpose in base 11 of channel 17, thereby to secure member 15 in position. It will be understood, however, that any other suitable fastening means may be provided. For instance, the openings 18 may be omitted, and instead portion 16 may be welded to the base 11 of channel 17.

In any event, with portion 16 secured to base 11 within channel 17, portion 19 of member 15 then extends in a rearward direction, that is, from the portion 16 toward rear wall 4 of the casing. Portion 19 terminates in a portion 20, which extends in a direction generally parallel to rear wall 4. Portion 20 is provided with an opening 21 to which, as will be further described hereinbelow, liner 14 may be secured. It will thus be understood that with an assembly 15 in each corner of opening 9, the liner will be secured in four positions so as to be rigidly held to casing 1.

It is important, in connection with our improved method of providing the refrigerator cabinet assembly, to close the gap which exists as a result of the curved nature of member 15 compared to the right angle corner in which it fits. To effect this, any suitable means may be provided. Where, as shown, member 15 is held in position by threaded members, a small mass, such as that shown at 22, of a putty-like material, may be manually positioned in the corner. Then, when the member 15 is put into its position as shown in FIGURE 5, the mass will be squeezed so as to completely block the gap between the curved back of member 15 and the inner walls of outer casing 1.

The first step in our process is to provide a suitable thickness of foamed insulating resin. It is highly desirable to cause this resin to be foamed so that it adheres to the outer casing 1. This gives the outer casing 1 a great deal of rigidity and permits the insulation and the casing to be handled as a unit. However, it is just as desirable that the liner 14 not be permanently secured to the foam since the liner may need to be changed for one reason or another. This may, for instance, happen in the factory because the original liner was defective, or it may result from something occurring to the original liner during use later on. Furthermore, repairs on other parts of the refrigerator can be greatly facilitated if the liner is removed.

Rigid foamed polyurethane resins are known to have excellent insulating properties and to be highly adhesive to mose surfaces, including untreated metal surfaces; they are, therefore, excellent for use as insulation for refrigerator cabinets. The general process of forming rigid foamed polyurethane resins is well known; conventionally, they are formed from either liquid polyester or polyether polyurethane reaction mixtures. The polyester polyurethane resins, for example, are made by reacting a slightly branched polyester with a di-isocyanate or by reacting a linear polyester with a mixture of di- and tri-isocyanates to form cross linked rigid or solid resious products. By including a slight excess of di-isocyanate and a small amount of water, reaction of the isocyanate with the water will generate carbon dioxide as a foaming or expansion gas. Alternatively, a halogenated alkane may be dispersed or dissolved in one or both of the reactants so that vaporization thereof by the heat of the resin forming reaction will provide the desired foam structure. Suitable catalysts or activators are of course also included in the reaction mixture.

In order to provide foamed resin in adhesive relationship with casing 1, but not with the liner 14, casing 1 is positioned over a male mold member 23, best shown in FIGURE 6. The casing 1, in position on mold member 23, is shown in FIGURE 7. It will be understood that before casing 1 is positioned on the mold member, as shown, appropriate preliminary steps may be provided as required by a particular shape of the cabinet assembly. For instance, it is often deemed desirable to provide a channel at the bottom front of opening 9 for various liquid and gas conduits, and electrical conductors (not shown). So as to insure that this channel will be provided, a suitable member such as that shown at 24 in FIGURE 5 may be provided extending from engagement with portion 16 of a lower member 15 at one side of opening 9 to engagement with portion 16 of the lower member 15 at the other side thereof. This provides, in cooperation with members 15, a continuous surface against which closure may be effected for molding purposes. After molding, member 24 will, when removed, provide the desired channel. By the same token, it will readily be recognized that it is important to close openings 21 during the molding operation. This may be done by any suitable means, such as simply covering the opening with adhesive tape so that resin will not escape therethrough as it foams.

Mold member 23 has, in essence, the same general configuration as liner 14, but is slightly larger than the liner. As a result, when casing 1 is placed over mold 23, and the molding operation takes place, as will be described, the foamed resin which is molded between the mold and casing 1 has a thickness slightly less than the distance between liner 14 and casing 1, as predetermined by the shape of the two members and the manner in which they are eventually fastened together.

Along the sides of the mold structure there are provided rubber-covered adjustable mounting pads 24, as shown in FIGURE 9. Flange portion 8 of casing 1 rests on the mounting pads 24, and it will be understood that the mounting pads are so adjusted that, with the flange 8 resting thereon, casing 1 can pass over the mold member 23 the proper distance to provide a desired thickness of insulation in adhesive relationship to the back wall 4.

It will further be understood that mold 23 is necessarily provided with a covering or a surface which is not adhesive to the resin to be foamed. While this may be effected by providing a suitable coating on the mold, such as a silicone material, we prefer to utilize a thin film of polyethylene material which is draped over the mold 23 so as to constitute a complete barrier preventing any portion of the mold from being contacted by the resin to be foamed. The particular nature of the polyethylene film, and the manner in which it is used, form a part of a sole invention of Arthur J. Harder, and are described and claimed in the application Serial Number 485,985, filed concurrently herewith now abandoned, and assigned to the same assignee as the present invention.

In order to seal off the space within the mold, the mold structure includes at the bottom thereof (see FIGURE 9 in conjunction with FIGURE 6), an inflatable tube structure 26 which extends entirely around the mold at the base thereof. When the tube structure 26 is in its deflated condition the casing 1 may be readily slipped down over the mold until it rests on pads 25. Once the casing is in position on the pads, the tube assembly 26 may be inflated to the position shown in FIGURE 9 wherein it engages firmly the edge 27 of flange portion 12 entirely around the sides and top of opening 9. Along the bottom edge of opening 9, the inflation of tube assembly 26 causes it to engage edge 28 of member 24 shown in FIGURE 4. Thus, entirely around the opening 9 there is a secure engagement of the edge by the tube assembly 26, and therefore a sealing off of the space within the mold. While this structure is described herein to provide a complete understanding of the molding operation, this particular means of sealing the opening also is the sole invention of Arthur J. Harder, and also is included in the aforementioned copending application.

A further point to be noted in FIGURE 9 is the provision of polyethylene film 29, briefly described above as constituting a desirable feature in the overall process.

During the resin foaming process, the foam normally exerts a small positive pressure from within casing 1. Consequently, it is desirable to provide suitable support for the surface of the casing during the molding operation. While this may be provided in any conventional manner, the usual approach is to cover the outer surfaces of casing 1, to as great an extent as possible, with reinforcing plates such as those partly shown at 30 in FIGURE 7. It will be understood that these plates preferably cover the major portion of the area of the bottom, top, sides and back surfaces of casing 1. In addition to their support function during the molding process, such surfaces may, where they form an integral part of the molding apparatus, serve as a final positioning means for the casing. Thus, the casing may be placed over the mold until it rests on support pads 25; then the support panels 30 may be moved into their supporting position in which they also perform the function of correctly positioning the casing 1 in the proper horizontal position relative to mold 23. And then the tube assembly 26 may be inflated, sealing off the space between the mold and the outer casing.

With casing 1 properly positioned on mold 23 then, appropriate resin injection conduits 31 are brought down so that they extend through openings 32 provided in the back surface 4 of casing 1 for that purpose. As shown in detail in FIGURES 10 and 11, each opening 32 is provided with a suitable check valve structure 33. The particular structure and manner of operation of check valve 33 are the sole invention of Arthur J. Harder, and are described and claimed in application Serial Number 485,984, filed concurrently herewith now Patent No. 3,364,941 and assigned to the same assignee as the present application. In general, the valve member 33 includes an edge portion 34 by means of which it is rigidly secured to casing 4 at opening 32, and operative portions 35 and 36 which cooperate to permit the entrance of the end of conduit 31, but which respond to internal pressure caused by the expansion of the resin as it foams to shut off the opening 32 as shown in FIGURE 11.

The molding step then, is commenced by the introduction of appropriate material through conduits 31, as shown in FIGURE 10. As stated above, we prefer to provide a rigid foamed resin of the polyurethane type.

This type of resin may be caused to foam by vaporization of a halogenated alkane, with the result being a foamed closed cell resin mass whose cells are filled with gas. It is well known that this is an excellent type thermal insulator and permits much thinner insulating walls to be used than previous types. Further, this type of resin is self-curing, without any need for special treatment, and cures to a rigid consistency in a matter of minutes.

With the foregoing facts known, it is a simple matter to introduce the appropriate amount of resin to conduits 31 and then to withdraw the conduits so that they are removed from the structure and are ready for a subsequent molding operation. The resin then proceeds to foam within the space defined by the mold and casing 1. We have found that when the resin is introduced, part of it flows down to the botom of the mold cavity, i.e., the portion of casing 1 adjacent tubing 26, and part remains on the flat top of mold member 23. As a result, the expansion of the resin as it is foamed pushes the air up from the bottom of the mold and across the top of the mold from the center toward the edge thereof. A substantial part of the air being thus moved then escapes through the minute openings which exist at the junction of back member 4 with the other parts of casing 1. Because the foam is expanding toward these openings from two directions—up along the sides and across the top—the area of these air openings is, it has been found, the last to be filled with foam. Consequently, with the arrangement described, the spot welded structure provides an escape route for much of the air originally in the mold. While there is a tendency for foam to try to force its way out between the spot welds toward the end of an operation, it hardly ever happens that any foam does push all the way to the outside of the cabinet. Rather, the heating—and curing—effect of metal surfaces acting on a very thin section of foam, plus the fact that the foam reaches the openings only toward the end of a foaming operation, result in curing of the foam before it reaches the outside of the casing.

One other place where air may be trapped, it has been found, is at the bottom of the mold in the region shown in FIGURE 9. As more fully described in the aforesaid application S. N. 485,985, the relatively low pressure used to inflate tube 26 permits the pressure of the trapped air to deform the tube so that the air can then escape between the tube and edge 27.

The small quantity of foamed resin shown at 37 in FIGURE 11 is a result not of leakage from within the casing 1, but of the fact that a few drops of resin may be left by conduit 31, as it is withdrawn. Resin mass 37 may be broken or cut off, with the result that a virtually smooth surface is provided at the openings 32 in back surface 4 of casing 1. At this point the resin has been cured, and it has a shape defined by mold 23 and casing 1. Further, because of the nature of foaming type resins, and particularly polyurethane resins, it is very strongly adhered to the inner surface of casing 1.

To remove casing 1 from mold 23 the mold is provided with a number of air valves 38. Referring to FIGURE 8, the operating structure for the air valves can readily be seen to be a very simple one. An airtight member 39 is rigidly fastened to the underside of mold surface 23 with the valve member 38 being biased to its closed position against surface 23 by any suitable means such as a spring 40, for instance. An inlet 41 is provided for air under pressure which may be introduced from any suitable source (not shown) through a conduit 42. When the casing 1 with the cured resin is to be removed from mold 23, air is introduced through conduit 42 to lift each of the valve members 38. In effect, then, the casing with the cured resin adhered thereto cooperates with the mold in a piston and cylinder relationship, with the air therefore causing the casing to rise upon the mold 23, so that it may very readily and easily be removed. At this point in time the casing 1 has the appearance shown in FIGURE 1, that is, the foam resin is completely formed and adhered thereto.

One point that is of significance to the over-all cabinet assembly, although it does not form a part of the present invention, is that it is desirable to form a basin 43 in the surface of the foam covering the bottom 6 of the casing 1 so that condensate may be led into this basin and then to a drain opening 44. From the drain opening it will be escape in the conventional way so as to be evaporated in any suitable manner, usually by contact with the warm operating parts of the compressor system. The forming of this basin and the opening 44 may be achieved by a movable insert portion 45 provided in mold 23. This structure and its operation also are the sole invention of Arthur J. Harder, and are also described and claimed in the application Ser. No. 485,985 filed by him concurrently herewith.

At this point, referring to liner 14, it is to be observed that, in the same manner as did casing 1, it has side walls 45 and 46, a top wall 47, a back wall 48 and a bottom wall 48a; while the interior of the liner is shown as being completely plain for the sake of simplicity, it will be understood that it may be made to have any shape and be provided with any attachments suitable for use in a refrigerator.

The liner is attached to casing 1 by means of four tabs 49 which extend outwardly at the four corners of the open face 50 of the liner. When the liner is inserted within the casing 1, the tabs match up with portions 20 of members 15 so that the openings 51 in the tabs are aligned with the openings 21 in the members 15. It is then a very simple matter to secure them together by any appropriate threaded means. It will, however, be understood from the description of the molding process that because the mold was deliberately made larger than the liner, there would be a space all around the liner, between it and the foam insulation, if it were secured to the casing 1 at this point in time. Some clearance of this nature is important because, with mass produced objects of this size, very close tolerances are not feasible. Even though one liner might fit snugly inside the foam, another liner made in precisely the same way might not fit properly or even be insertable at all within a casing which had already been provided with foam.

Nonetheless, it is undesirable to have space between the liner and the foam insulation over the height of the refrigerator, since air will then tend to circulate, with warm air rising and cold air descending, so that there will be a substantial circulation of air and heat will, as a result, be transferred in a manner most undesirable in a refrigerator. To prevent this from happening, a suitable air barrier is provided.

In the present case this consists of a thin layer of flexible and compressible material, such as glass wool, which is adhesively secured to the surface of the foam insulation. In its most economical aspect, most of the air circulation can be broken up simply by providing a belt of such glass wool around the inside of the foam insulation at a height intermediate the top and bottom of a refrigerator cabinet. However, we prefer to provide this glass wool so that it completely covers both sides, the back, and the top surfaces between the liner and the foam. Such glass wool may, for instance, be provided in sheets on the order of ½-inch thick in an uncompressed condition. When this dimension is added to the thickness of approximately 1¼ inches of rigid foam provided by the mold around the sides, back and top of casing 1, the additive thickness of the flexible glass wool and the inflexible foam insulation is greater than the distance which will exist between liner 14 when it is inserted and secured to casing 1, as described above. As a result of this, the securement of the liner as described will provide compression of the glass wool, thus causing it to become an excellent air barrier.

It is to be emphasized that the function of the glass wool is to prevent the flow of air, and that the heat insulation from outside is, in effect, virtually completely provided by the foam insulation. Thus, in summary, after the molding operation the glass wool is adhesively secured to the surface of the foam insulation, and then the liner 14 is rigidly secured to casing 1 at the open face thereof so as to compress the glass wool. The parts in their assembled relationship can readily be seen both in FIGURE 2 and FIGURE 3, while FIGURE 1 shows the parts in an exploded relationship, that is, prior to their assembly together. It can readily be seen, from the foregoing description of the method for assembling the refrigerator cabinet, that the presence of defects in the foam will be known immediately as an inherent result of lifting casing 1 off the mold, since the interior of the casing with its coating of foam will promptly be visible in its entirety. The securement of the glass wall or some other suitable air barrier to the foam subsequently is a very quickly and economically effected operation; and the securement of the liner to the casing to complete the assembly is also easily effected. Any change of the liner that is desired is also effected quickly, and the introduction of the liner automatically compresses the flexible air barrier so as to improve its quality insofar as prevention of air circulation is concerned.

There is the added important advantage that the assembly method described provides an excellent sound and vibration barrier, in the glass wool, so that great rigidity is obtained by the rigid foam secured to the outer casing without the accompanying disadvantage of undesirable sound transfer or amplification.

It will be understood that, while in accordance with the patent statutes we have described what at present is considered to be the preferred embodiment of our invention, it will be obvious to those skilled in the art that various changes and modifications may be made therein without departing from our invention, and it is therefore aimed in the appended claims to cover all such changes and modifications as wall within the true spirit and scope of our invention.

What we claim as new and desire to secure by Letters Patent of the United States is:

1. A method of forming a refrigerator cabinet assembly including an outer open face casing and an inner liner spaced a predetermined distance from said outer casing, and adapted to be secured thereto at the open face thereof, comprising the steps of:
   (a) positioning said casing on a mold slightly larger than said liner, molding and curing rigid foamed insulation between said casing and said mold, and releasing said foamed insulation from said mold;
   (b) securing a layer of flexible compressible insulating material to the inside surface of said foamed insulation extending from one side to the other of said open face over at least the vertically intermediate portion of said casing; and
   (c) inserting said liner into casing and securing said liner to said casing at the open face thereof; said layer of insulating material having a thickness such that said predetermined distance is greater than the thickness of said foamed insulation, but slightly less than the combined thickness of said foamed insulation and of said layer of insulating material in an uncompressed state.

2. The method defined in claim 1 wherein the flexible material secured to the inside surface of said foamed insulation is formed of glass wool.

3. The method defined in claim 1 wherein said layer of flexible material is formed to cover both sides, the back and the top of said foamed insulation lining said casing inner surface.

4. The method defined in claim 1 wherein said opening of said open face casing and of said inner liner are substantially rectangular, said liner being secured to said casing at the four corners defining said openings.

5. The method defined in claim 1 wherein said layer of flexible material is secured to the inside surface of said foamed insulation by adhesion.

6. A method of foarming a refrigerator cabinet assembly including an outer open face casing and an inner liner spaced a predetermined distance in from said outer casing and adapted to be secured thereto at the open face thereof, comprising the steps of:
   (a) securing the back panel of said casing to the remainder of said casing by spot welding so that small air passages exist between said spot welds,
   (b) positioning said casing face down on a mold slightly larger than said liner, introducing foamed insulation between said casing and said mold through the back of said casing so that part of the foamed insulation flows down to the face and part remains on the upper surface of the mold, whereby the foaming expansion of said insulation causes the spot welding junction of the back of said casing to the sides of said casing to be the last space filled with insulation whereby air may be expelled between said spot welds during expansion of said foamed insulation,
   (c) releasing said foamed insulation from said mold so that said casing has its inner surface lined with said foamed insulation,
   (d) securing a layer of flexible compressible glass wool to the inside surface of said foamed insulation extending from one side to the other of said open face over at least the vertically intermediate portion of said casing; and
   (e) inserting said liner into said casing and securing said lining to said casing at the open face thereof, said glass wool layer being of a thickness such that said predetermined distance is greater than the thickness of said foamed insulation but slightly less than the combined thickness of said foamed insulation and of said glass wool layer in an uncompressed state.

References Cited
UNITED STATES PATENTS

| | | | |
|---|---|---|---|
| 3,080,267 | 3/1963 | Schmalz | 264—45 |
| 3,221,085 | 11/1965 | Rill et al. | 264—45 |

JULIUS FROME, *Primary Examiner.*

L. GARRETT, *Assistant Examiner.*

U.S. Cl. X.R.

264—51, 54; 312—213